United States Patent Office 3,378,508
Patented Apr. 16, 1968

3,378,508
TACKIFYING CEMENTS FOR EPM AND EPDM RUBBER USING CYCLIZED NATURAL RUBBER
Parviz Hamed, Akron, and Everett T. McDonel, Brecksville, Ohio, assignors to The B. F. Goodrich Company, New York, N.Y., a corporation of New York
No Drawing. Filed Sept. 28, 1965, Ser. No. 491,031
4 Claims. (Cl. 260—5)

ABSTRACT OF THE DISCLOSURE

Tackifying cements for EPM and EPDM rubbers comprise mixture of (1) reinforced base polymer, (2) a raw polymer cohesive agent, and (3) a combination of tackifying resin and a softening agent. The raw polymer cohesive agent may be cyclized natural rubber when that material is first dissolved in a high boiling, non-volatile polar liquid which is in turn miscible with aliphatic hydrocarbon solvents.

---

This invention relates to tackifying cements for use with elastomeric materials based on ethylene-propylene copolymers and ethylene-propylene-diene terpolymers and to a method of preparation of said cements.

Any synthetic elastomer is of interest to the manufacturer of molded, extruded and cast articles made traditionally from natural rubber or any of the synthetic substitutes and alternative materials for natural rubber which have been developed in recent years. Elastomers currently receiving much attention, particularly because of their potential low cost and high resistance to weather, age, heat and ozone, are copolymers of ethylene and propylene and the terpolymers of ethylene-propylene and a straight chain or cyclic diolefinic material, the manufacture of which is disclosed in United States patents including 2,933,480, 3,000,866 and 3,000,867. These ethylene-propylene-diene terpolymers are currently identified as EPDM rubbers in the ASTM designation D1418–56T, and ethylene-propylene copolymers are designated as EPM rubbers. Hereinafter, when EPDM rubbers are referred to it is to be understood that EPM rubbers are means as well. The major difference between the two types of materials is that EPM rubbers are cured in a peroxide cure system. They are so completely unsaturated that a sulfur cure is not possible. EPDM rubbers, containing some unsaturation in the diene component present, do undergo sulfur cure. A major deficiency of EPM and EPDM rubbers, in the eyes of the rubber industry is their lack of tack, which makes it impossible to build shaped articles by the processes employed with natural rubber.

To become a major item in the present day synthetic rubber industry, a material must lend itself to the manufacture of shaped articles such as tubing, belts, and the major product, tires. If a new material is low enough in cost and has sufficiently outstanding properties, the industry will make every effort to use it in spite of building tack deficiencies that make it more difficult to employ than the favorite natural rubber (NR). Other synthetic materials, including styrene-butadiene rubber (SBR), and butyl rubber (IIR) have presented this same difficulty. The SBR and IIR materials lack the green strength and tackiness of natural rubber, and tires and other shaped rubber products have been successfully made from them when compounding techniques and new additives have been developed that impart proper building tack to them. When natural rubber techniques are following in building a tire, from the ethylene-propylene-diene terpolymers, the effort meets with failure. Styrene-butadiene rubber can be formulated into tires using either blends with natural rubber or cements of high Mooney viscosity SBR with oil-soluble blocked phenolic resins. These techniques cannot be used with EPDM terpolymers. Blends of natural rubber and EPDM rubber do not cure compatibly. The SBR tackifying cements, when applied to EPDM rubber stock, impart sufficient green strength for building a tire, but lack the ability to maintain adhesion at the stock interfaces when the tire is cured or vulcanized and the tire delaminates. Butyl rubber cements, made in a manner similar to SBR cements but using butyl rubber, impart enough tack to butyl rubber to allow manufacture of butyl tires, but these cements do not help with construction of an EPDM tire because they do not tolerate the high oil levels of EPDM stocks. The prior art phenolic, terpene, and natural resin tackifiers are actually found to severely retard EPDM terpolymer cures and they also cause bloom when mixed into the bulk of the polymer. If one follows the teaching of the prior art and prepares similar cements of EPDM rubber and oil-soluble blocked phenolic resin, the effort of building an EPDM tire will still not be crowned with success. The strength of uncured cement films of these materials is low. When coated with one of these tackifying cements and stored in conventional cloth liners according to industry practice, sheets of EPDM terpolymer lose virtually all tack imparted by the cement in 24 hours or less.

The property of tackiness in rubber and rubberlike materials has several aspects and is difficult to evaluate on a numerical basis. The Wallace Tackmeter is one laboratory instrument that has been devised to measure tack in rubber and rubber cements. Wallace Tackmeter results reported herein are obtained using a 180 g. load and a contact time of one minute. Unfortunately, a sample exhibiting good tack sufficient for building a tire, for example, will register above the maximum tackmeter reading of 1000. Tack contributes unvulcanized green strength or building strength to a rubber so that a shaped article will hold together as it is formed and carried to the vulcanizer and in vulcanization it contributes to the ability of the article to cure without losing interface adhesion at the ply surfaces. In the forming of a shaped article, the materials must have the property of "quick grab," that is, when lightly and rapidly touched together, they should immediately adhere to each other with sufficient force to support their own weight. When two pieces are lightly pressed together, held together approximately one second, then pulled apart, the degree of hand pull is a measure of tack. When two pieces are touched together, pulled apart, and touched together again, the materials must adhere firmly after the final contact. Subjective evaluation of tack of this nature are extremely valuable and accurate when performed by one skilled in the art. They are referred to as "Quick Tack," "Hand Pull," and "Repeat Tack" tests. A further test that is important in evaluating rubbery stocks for use in construction of tires is the static cured adhesion test. In this test, two pieces of stock 6" x 1" x ½" are coated on one side with tackifying cement. The samples are allowed to stand until the solvent has evaporated, then the cemented sides are pressed together for 60' at 302° F. under 200 p.s.i. pressure. The cured sample is then subjected to 180°, 10" per minute pull in an Instron tensile test machine. The sample should fail in the stock, not in the cement line.

Natural rubber combined with SBR imparts tack to the synthetic that is acceptable for many purposes. When natural rubber is combined with EPDM terpolymer, the tack properties are not satisfactory and the materials are incompatible in cure because EPDM is practically saturated and natural rubber is highly unsaturated. If natural rubber were more saturated, that is, if it contained fewer double bonds, it might be more compatible in cure with EPDM. One form of saturated natural rubber is that known as cyclized rubber. This is a natural rubber that has been heat treated with a strong organic sulfonic acid or organic sulfonyl chloride such as phenol sulfonic acid and converted to the form of a hard, tough resin which is washed clean of excess acid. Cyclized natural rubber softens under the influence of heat, but even when so softened it is found to be incompatible with an EPDM polymer. When an EPDM, cyclized rubber cement is prepared using an aliphatic hydrocarbon solvent or a substituted aliphatic hydrocarbon solvent, the cyclized rubber is not compatible with EPDM and yields a resinous surface having no tack, or a very low tak, within 5–10 minutes after application.

Copending application Ser. No. 491,035, filed September 28, 1965 discloses a method of preparing a tackifying cement for EPDM polymer comprising separately dissolving (1) 100 parts of a reinforced base polymer compounded for cure (2) from 5–25 phr. of a raw polymer cohesive agent and (3) a combination of 10–40 phr. of a tackifying resin and 20–100 phr. of a low molecular weight polymer softening agent. The three solutions are blended and the mixed solution is diluted to a total solids in the range of 5% to 20%.

It would be desirable to employ a saturated natural rubber, e.g. cyclized natural rubber, as (2) the raw polymer cohesive agent in the EPDM tackifying cement system described above because of the potentially high cement strengths attainable. When attempts are made to dissolve cyclized natural rubber in the aliphatic hydrocarbon solvents and substituted aliphatic hydrocarbon solvents employed as set forth in Serial Number 491,035, it is found that the cyclized natural rubber does not disperse in the solvent satisfactorily and seems to form a hard, resinlike surface on the cement without imparting any strength to the cement.

A method has now been discovered to use a cyclized natural rubber as the raw polymer cohesive agent in tackifying cement systems for EPDM terpolymers made as described in copending patent application Ser. No. 491,035. The method involves first dissolving the cyclized natural rubber with a high boiling (150°—300° C.) relatively non-volatile polar liquid that is in turn at least partially miscible with the aliphatic hydrocarbon solvents and substituted aliphatic hydrocarbon solvents used to dissolve the components of the EPDM tackifying cement. The polar liquid does not dissolve the EPDM terpolymer. It is selected from the group consisting of polar materials (ketones, alcohols and esters) with boiling points from 150° C. to 300° C. and may be a material such as, 2-cyclohexylcyclohexanone, cyclohexanol, cyclohexanone, or ethylene glycol-monobutyl ether.

Cyclized natural rubber is mixed with the high boiling polar liquid in the range of 1 to 2 parts of polymer to 2 parts of liquid by weight. The mixture is stirred and dissolved in an aliphatic hydrocarbon solvent or substituted aliphatic hydrocarbon solvent and this solution is added to separately prepared solutions of reinforced EPDM terpolymer, and tackifying resins and softening agents. The tackifying cement that is formed by the mixture of the three solutions has a high level of uncured strength and tack compared to a similar blend of solutions where the only difference is that the cyclized natural rubber is dissolved directly in general solvent and no polar liquid is present.

The following examples will illustrate the practice of this invention. Parts are given as parts by weight.

EXAMPLES I–II

A commercial EPDM terpolymer, 63 mol percent ethylene, 1.5 mol percent diene, DSV 2.3, Mooney viscosity 80, is mill blended with carbon black and curing compounds and the compounded polymer is dissolved in a mixture of 50 parts hexane/50 parts trichloroethylene.

As a cohesive agent, raw cyclized natural rubber, prepared by milling and heating natural rubber and phenyl sulfonyl chloride for 3 hours and then washing the rubber free of excess chloride, leaving the rubber in a hard, balata-like condition, is dissolved in the same solvent.

As a tackifying resin and softening agent, a polycondensation product of p-tert.-butyl phenol and acetylene and poly 1-butene (mol wt. 1000–500) are also dissolved in the same solvent.

The three solutions are blended, and diluted to 10% total solids. This cement is coated on EPDM carcass stock and evaluated for hand pull.

| | I | II |
|---|---|---|
| Material, Parts: | | |
| EPDM terpolymer | 100 | 100 |
| Carbon black | 60 | 60 |
| Zinc oxide | 5 | 5 |
| Naphthenic process oil | 5 | 5 |
| Tetramethylthiuram monosulfide | 1.5 | 1.5 |
| 2-mercaptobenzothiazole | 0.75 | 0.75 |
| Sulfur | 1.5 | 1.5 |
| Cohesive agent: | | |
| Cyclized natural rubber | 50 | 30 |
| Tackifying resin | 30 | 30 |
| Softening agent | 20 | 20 |
| Test Results—Hand Pull: | | |
| Fresh | Good | Good- |
| Aged 1 week at room temperature in cloth liner | Fair | Fair |

EXAMPLE III

The procedure of Example I is followed, except that the cohesive agent, cyclized natural rubber, is first treated with equal parts of a polar liquid, 2-cyclohexylcyclohexanone. This forms a gel-like mixture which is then dissolved in the general solvent 50 parts hexane/50 parts trichloroethylene. The final cement is diluted to 10% total solids and evaluated on EPDM carcass stock for Hand Pull and static-cured adhesion using the Instron pull.

| Material: | Parts |
|---|---|
| EPDM terpolymer | 100 |
| Carbon black | 60 |
| Zinc oxide | 5 |
| Paraffinic process oil | 5 |
| Tetramethylthiuram disulfide | 1.5 |
| Benzothiazyl disulfide | 0.75 |
| Sulfur | 1.5 |
| Cohesive agent: | |
| Cyclized natural rubber | 25 |
| 2-cyclohexylcyclohexanone | 25 |
| Tackifying resin | 30 |
| Softening agent | 20 |

Test Results

HAND PULL

Fresh _____ Very good
Aged 1 week at room temperature in cloth liners _____ do.

CURED ADHESION—LBS./IN.

Stock failure
Room temperature _____ 120
Aged 3 days at 212° F., pulled at 212° F. _____ 90

The tackifying cement of this invention imparts good building tack to EPDM stocks and this tack is maintained during storage at room temperature with no diminution after one week. The cement also delivers adequate fresh aged cured adhesion, which is to be expected.

We claim:
1. The method of making a tackifying cement for EPDM terpolymer rubbers comprising separately dissolving in a solvent selected from the class consisting of aliphatic hydrocarbon solvents and substituted aliphatic hydrocarbon solvents (1) 100 parts of a base EPDM polymer containing about 60 parts of carbon black and curing pigments for a sulfur cure including 1.5 parts sulfur, 0.75 part 2-mercaptobenzothiazole or benzothiazyl disulfide, 1.5 parts tetramethylthiuram disulfide or tetramethylthiuram monosulfide, 5 parts napththenic process oil or paraffinic process oil and 5 parts zinc oxide, said pigments having been dispersed in said base polymer by milling, (2) 5–25 phr. of a raw polymer cohesive agent, and (3) a combination of 10–40 phr. of a resinous polycondensation product of p-tert. butyl phenol and acetylene and 20–100 phr. of a low molecular weight poly 1-butene, blending said solutions of (1), (2) and (3) and diluting said blended solution to 5%–20% total solids, said method including the improvement of using as said raw polymer cohesive agent a cyclized natural rubber, said cyclized natural rubber being dissolved in a polar liquid with a boiling point between 150° C and 300° in the weight ratio of 1 to 2 parts cyclized natural rubber per 2 parts polar liquid before being dissolved in the solvent selected from the class set forth above, said polar liquid being at least partially miscible with the said hydrocarbon solvents.

2. The method of claim 1 wherein said polar liquid is selected from the class consisting of ketones, alcohols and esters having boiling points between 150° C. and 300° C.

3. A tackifying cement for EPDM terpolymer rubbers comprising a blend of solutions in solvent selected from the class consisting of aliphatic hydrocarbon solvents and substituted aliphatic hydrocarbon solvents of (1) 100 parts of a base EPDM polymer, 60 parts of carbon black, 1:5 parts sulfur, 0.75 part benzothiazyl disulfide, 1.5 parts tetramethylthiuram disulfide, 5 parts paraffinic process oil, and 5 parts zinc oxide, (2) 5–25 phr. of a raw polymer cohesive agent, and (3) a combination of 10–40 phr. of a resinous polycondensation product of p-tert. butyl phenol and acetylene and 20–100 phr. of low molecular weight poly 1-butent, said blend of said solutions (1), (2) and (3) being diluted to 5%–20% total solids, and wherein the said cohesive agent consists of a cyclized natural rubber, said cyclized natural rubber being dissolved in a polar liquid with a boiling point between 150° C. and 300° C. in the weight ratio of 1–2 parts cyclized natural rubber per 2 parts polar liquid before being dissolved in the solvent selected from the class set forth above.

4. The tackifying cement of claim 3 wherein said polar liquid is selected from the class consisting of ketones, alcohols, and esters having boiling points between 150° C. and 300° C.

References Cited

UNITED STATES PATENTS 2,555,068   5/1951   Van Veersen _____ 260—734

OTHER REFERENCES

Amberg et al., "The Hercules EPT," Rubber World, March 1963, pp. 52–59.

ALLAN LIEBERMAN, *Primary Examiner.*